March 4, 1969

J. A. JUNCK ET AL 3,430,657

BALANCING OF GRAVITATIONAL FORCES IN A
VERTICALLY DISPOSED VALVE SPOOL

Filed Dec. 15, 1966

INVENTORS
John A. Junck
Roger A. Rice

BY
Fryer, Zimmwald, Feix & Phillips
ATTORNEYS

United States Patent Office 3,430,657
Patented Mar. 4, 1969

3,430,657
BALANCING OF GRAVITATIONAL FORCES IN A VERTICALLY DISPOSED VALVE SPOOL
John A. Junck and Roger A. Rice, Joliet, Ill., assignors to Caterpillar Tractor Co., Peoria, Ill., a corporation of California
Filed Dec. 15, 1966, Ser. No. 602,081
U.S. Cl. 137—625.67                3 Claims
Int. Cl. E03b; E03c; F17d

ABSTRACT OF THE DISCLOSURE

A spool-type valve which is disposed vertically for reciprocation of the spool in two directions from a neutral position and in which the gravitational force tending to move the spool downwardly is balanced by spring force so that valve movement in response to upward and downward bouncing action in a tractor-trailer hitch will be uniform.

---

Figure 1:
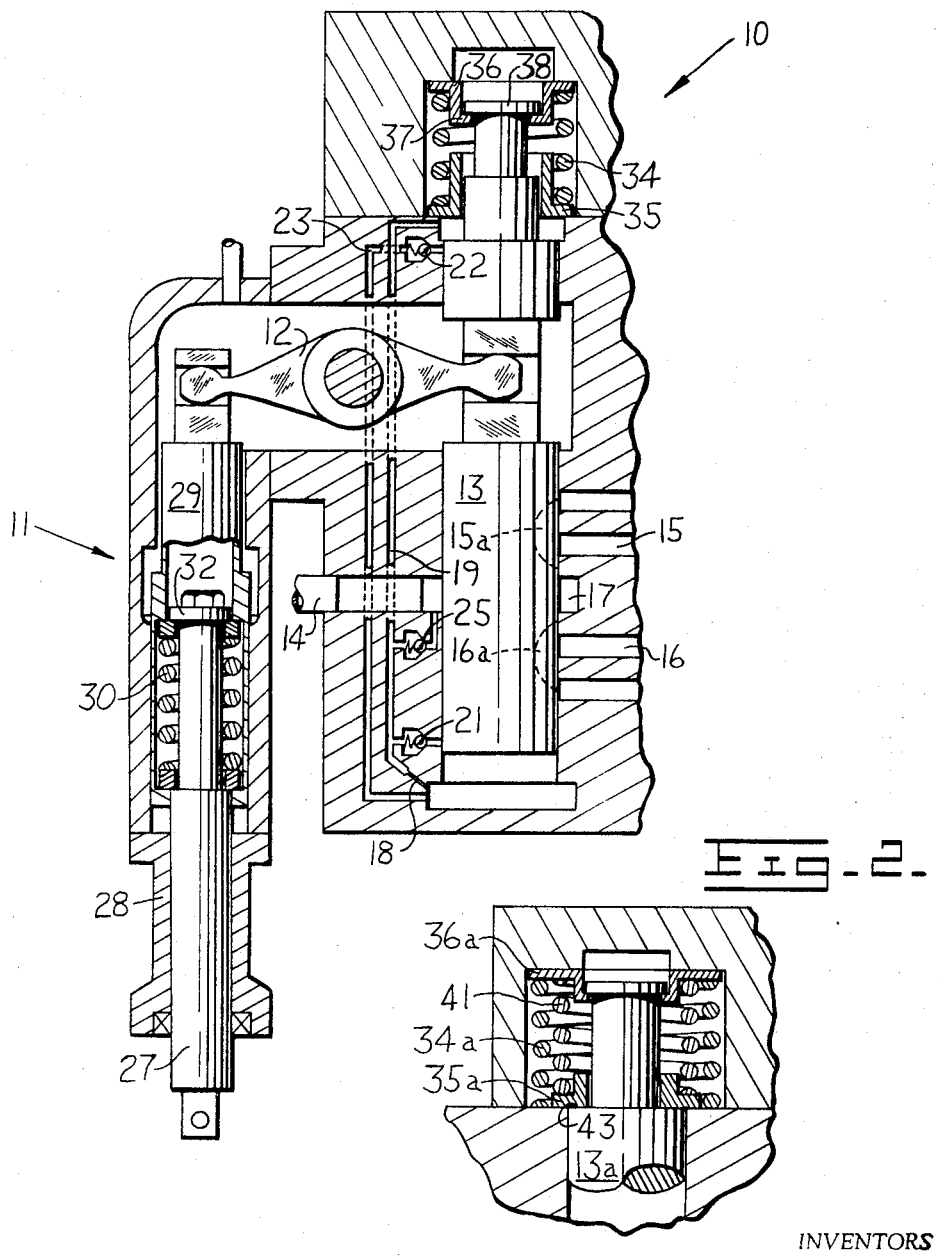

In our assignee's co-pending application of James C. Barton et al., application Ser. No. 461,887, now Patent No. 3,311,389, for System for Control of Pitch and Bounce in Tractor-Trailer Combinations, a tractor-trailer hitch is shown in which vertical motion is permitted, but limited and cushioned by a hydraulic cylinder connected between the units and associated with gas over oil accumulators to provide the desired spring rate. The hydraulic cylinder is vertically disposed and connected to one of the units and its piston is connected to the other unit. The piston is held substantially centrally of the cylinder by fluid under pressure in the system to maintain a level attitude between the two units when vertical movement takes place. When the trailer, which in this case happens to be an earthmoving scraper, is loaded, greater pressure is needed to maintain the piston at its intended central position. Consequently, the invention of the above-mentioned co-pending application provides self-centering means, including a valve for communicating fluid under pressure to the system in response to downward movement of the trailer as it becomes loaded, or in response to downward movement due to leakage in the system. It was necessary to prevent opening and closing of the valve each time the trailer moved vertically only briefly, as in traveling over a rough road. This was accomplished by connecting the valve spool between the tractor and trailer with a valve actuating linkage, including a resilient or compressible link. Thus, each time the trailer moved vertically, the link was compressed and charged with energy to actuate the valve. Action of the valve spool was retarded by restricting the passage of fluid from either of its ends to the other in such a manner that the valve would not open or close in response to quick bouncing motions between the tractor and trailer. Such valves are provided with spool centering assemblies normally holding them closed. Since it was mechanically expedient to mount this valve in a vertical position, the weight of the spool acted with the centering spring in one direction and opposed it in the other direction so that adjustments of the valve in opposite directions were not equally timed.

The principal object of the present invention is to overcome the difficulties recited above which occur upon operating a spring centered valve spool in a vertical position. Further and more specific objects and advantages of the invention and the manner in which the invention is carried into practice are made apparent in the following specification by reference to the accompanying drawing.

Figure 2:
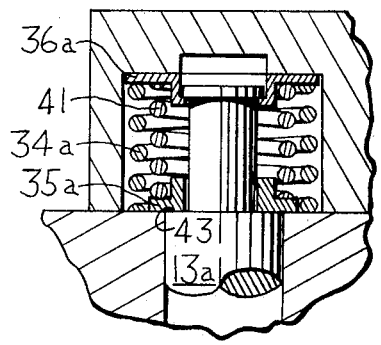

In the drawing:

FIG. 1 is a fragmentary central sectional view through a pilot valve embodying the present invention and linkage for imparting actuating movement to the pilot valve; and, FIG. 2 is a sectional view of a portion of the pilot valve shown in FIG. 1 and illustrating a modification of the invention.

Referring first to FIG. 1, a pilot valve generally indicated at 10 represents the valve in a system of the kind referred to above which directs fluid to a leveling valve not shown, the function of which is to communicate fluid under pressure to the cylinder disposed between the tractor and trailer for the purpose of centering the piston in the cylinder and to maintain a level attitude.

A linkage for imparting movement in opposite directions to the spool of the pilot valve 10 is generally indicated at 11, it being understood that the pilot valve may be carried either by the tractor or the trailer and that the linkage may be connected to the other vehicle in such a manner that upon relative vertical movement between the vehicles, the linkage will move vertically and impart oscillation to a lever 12 which, in turn, will shift the spool 13 of the valve 10.

Upon shifting of the valve spool 13, fluid under pressure entering the valve cylinder through a line 14 will be communicated either to a port 15 for directing fluid to one end of a leveling valve spool or a port 16 for delivering fluid to its opposite end. This is accomplished when either of a pair of slots 15a or 16a in the valve spool forms communication between an annular cavity 17 and one of the passages 15 or 16, the annular cavity 17 being in constant communication with the inlet line 14. Since it is desired that the pilot valve is not actuated in response to momentary or bouncing action, adjustment of the spool 13 is restricted by a restriction 18 in a passage 19 which communicates between opposite ends of the bore in which the spool reciprocates. Return of the spool to its central or neutral position is not so restricted because a check valve 21 communicates fluid at its lower end toward the upper end when the valve is in its uppermost position, and a check valve 22 communicates fluid through a passage 23 when the valve is returning from its lower position. Another check valve shown at 25 communicates fluid under pressure between the inlet line 14 and the passage 19 to insure make-up of fluid in both ends of the valve chambers, all as explained in the above referred to co-pending application.

The linkage for actuating the pilot valve comprises a rod 27 reciprocally mounted in a housing 28 and a rod 29 similarly mounted and connected to the rod 28 by a compressible spring 30. Rod 27 is also slidable at its upper end through a spring seat 32 and the interior of the hollow rod 29. Consequently, upon relative movement between the tractor and trailer in one direction, the rod 27 moves upwardly, compressing the spring and charging it with energy, the effect of which is to move the rod 29 upwardly and adjust the valve spool 13. To move the rod 27 downwardly, the spring 30 is again compressed, and in this case, charged with energy for moving the rod portion 29 downwardly to move the pilot valve spool 13 in the opposite direction. Consequently, quick or bouncing movements between the tractor and trailer merely load the spring 30, but when these movements are counteracted before the valve spool 13 moves against the retarding effect of the restriction 18, no effective adjustment of the spool 13 has taken place.

A centering spring assembly generally comprises a spring adjacent to one end of the valve spool 13, the tendency of which is to bias the spool toward a central or neutral position. However, with the spool arranged vertically as shown, the entire weight of the spool is added to the effect of the spring in moving it downwardly. Similarly, the weight of the link part 29 tends to move the valve spool upwardly against the action of the centering spring.

Since the weight of the valve spool 13 is considerably greater than the weight of the link part 29, there is a tendency for the valve spool to move downwardly much more rapidly than it moves upwardly under the influence of the equal forces exerted by the spring 30. To avoid this non-uniformity, the centering spring assembly of the present application has been modified and acts in one rather than in both directions. Thus, a spring 34 acts between a lower spring seat 35 and an upper spring seat 36. The upper spring seat has an inwardly directed flange 37 acting with an enlarged end 38 of the valve spool for urging the valve spool upwardly to its centered position. Gravity urges it downwardly. Consequently, when the spool is shifted downwardly, the spring 34 tends to return it to neutral; and when it is shifted upwardly, its own weight tends to return it to neutral.

The beneficial effect of this arrangement is that the spring counteracts the gravitational effect which formerly caused downward adjustment of the spool to occur more rapidly than upward adjustment.

FIG. 2 shows a modification wherein the invention is adapted to a spool 13a corresponding to the spool 13 of FIG. 1, and this modification will prove useful in connection with valves that are not actuated through linkage such as shown in FIG. 1, and in some cases, to valves which are not restricted in their adjustment. In this modification, spring 34a acts in the manner of the spring 34 of FIG. 1 to urge the valve upwardly toward its neutral position while a spring 41 acts between spring seats 36a and 35a, the spring seat 35a in this case bearing against a shoulder 43 on the valve spool. The force of spring 41 is selected to provide the desired bias of spool 13a towards its neutral position and the force of spring 34a is selected to counteract the force of gravity resulting from the weight of the valve spool.

We claim:
1. In a valve which comprises a housing having a spool slidable between two functioning positions and having an intermediate neutral position, spool centering means for urging the spool toward its neutral position when the axis of the spool is arranged substantially vertically, which centering means includes a spring urging the spool upwardly toward its neutral position with just sufficient force to overcome gravitational forces tending to move it downwardly.

2. The combination of claim 1 in which the spool is actuated through a resilient linkage having a mass tending to move the spool upwardly with less force than the said gravitational forces, and in which the force of the spring equals the difference between the gravitational forces and the force imposed by the mass.

3. The combination of claim 1 with a second spring augmenting the force of gravity on the spool above its neutral position and in which the first spring balances gravity and the second spring biases the spool toward its neutral position.

References Cited

UNITED STATES PATENTS

| 3,221,770 | 12/1965 | Faisandier | 137—625.68 XR |
| 3,253,613 | 5/1966 | Richolt | 137—625.69 XR |
| 3,311,389 | 3/1967 | Barton et al. | 280—489 |
| 3,114,361 | 12/1963 | Mullen | 267—1 XR |

FOREIGN PATENTS 1,160,423  3/1958  France.

HENRY T. KLINKSIEK, *Primary Examiner.*

U.S. Cl. X.R.

267—1; 280—489